(12) United States Patent
Huang

(10) Patent No.: US 10,807,189 B2
(45) Date of Patent: Oct. 20, 2020

(54) SYSTEM AND METHODOLOGY FOR WELDING

(71) Applicant: Schlumberger Technology Corporation, Sugar Land, TX (US)

(72) Inventor: Hongfa Huang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/275,948

(22) Filed: Sep. 26, 2016

(65) Prior Publication Data

US 2018/0085850 A1    Mar. 29, 2018

(51) Int. Cl.
| | |
|---|---|
| *B23K 23/00* | (2006.01) |
| *C06B 33/00* | (2006.01) |
| *E21B 33/00* | (2006.01) |
| *E21B 41/00* | (2006.01) |
| *E21B 33/12* | (2006.01) |
| *E21B 17/00* | (2006.01) |
| *E21B 47/09* | (2012.01) |

(52) U.S. Cl.
CPC ............ *B23K 23/00* (2013.01); *C06B 33/00* (2013.01); *E21B 17/00* (2013.01); *E21B 33/12* (2013.01); *E21B 33/1204* (2013.01); *E21B 41/0078* (2013.01); *E21B 47/09* (2013.01)

(58) Field of Classification Search
None
See application file for complete search history.

(56) References Cited

U.S. PATENT DOCUMENTS

| | | | |
|---|---|---|---|
| RE20,832 E | 8/1938 | Wells | |
| 2,191,783 A * | 2/1940 | Wells | ............... E21B 33/1204 166/135 |
| 2,286,075 A | 6/1942 | Evans | |
| 2,789,004 A | 4/1957 | Foster | |

(Continued)

FOREIGN PATENT DOCUMENTS

| | | |
|---|---|---|
| GB | 2065750 A | 7/1981 |
| WO | WO2013135583 A2 | 9/2013 |

(Continued)

OTHER PUBLICATIONS

International Search Report and Written opionion issued in the related PCT application PCT/2015/056161, dated Dec. 21, 2015 (16 pages).

(Continued)

*Primary Examiner* — Devang R Patel
(74) *Attorney, Agent, or Firm* — Cameron R. Sneddon (57) ABSTRACT

A technique facilitates a welding operation in a variety of difficult environments, including downhole environments, to enable formation a dependable connection between components. A tool may be constructed to contain a material mixture used in the welding operation. The tool is conveyed to a position adjacent a weld region of components to be welded together. The material mixture is of a type which may be ignited to initiate a reaction which forms a molten metal from at least one constituent in the material mixture. Additionally, the tool comprises a nozzle oriented to direct the molten metal to the weld region so as to form a secure, welded connection between the components.

14 Claims, 7 Drawing Sheets

(56) References Cited

U.S. PATENT DOCUMENTS

| | | | |
|---|---|---|---|
| 3,318,381 A | | 5/1967 | Brandt |
| 4,125,161 A | | 11/1978 | Chammas |
| 4,216,721 A | | 8/1980 | Marziano et al. |
| 4,298,063 A | | 11/1981 | Regalbuto et al. |
| 4,585,158 A | * | 4/1986 | Wardlaw, III ......... E21B 36/008 228/232 |
| 4,598,769 A | | 7/1986 | Robertson |
| 4,619,318 A | | 10/1986 | Terrell et al. |
| 4,808,037 A | | 2/1989 | Wade et al. |
| 4,996,922 A | | 3/1991 | Halcomb et al. |
| 5,129,305 A | | 7/1992 | Reilly |
| 5,411,049 A | | 5/1995 | Colvard |
| 5,435,394 A | | 7/1995 | Robertson |
| 5,833,001 A | * | 11/1998 | Song ....................... E21B 29/10 166/287 |
| 6,131,801 A | * | 10/2000 | Hagen .................... B23K 23/00 228/234.3 |
| 6,186,226 B1 | | 2/2001 | Robertson |
| 6,598,679 B2 | | 7/2003 | Robertson |
| 6,766,744 B1 | | 7/2004 | Song et al. |
| 6,925,937 B2 | | 8/2005 | Robertson |
| 7,124,820 B2 | * | 10/2006 | Wardlaw ................. E21B 29/10 166/277 |
| 7,290,609 B2 | * | 11/2007 | Wardlaw ............... E21B 33/134 166/192 |
| 7,690,428 B2 | | 4/2010 | Robertson |
| 7,726,392 B1 | | 6/2010 | Robertson |
| 7,900,704 B2 | | 3/2011 | Robertson |
| 7,934,552 B2 | * | 5/2011 | La Rovere ............. E21B 36/00 166/277 |
| 7,997,332 B2 | | 8/2011 | Robertson |
| 8,020,619 B1 | | 9/2011 | Robertson et al. |
| 8,167,044 B2 | | 5/2012 | Huang et al. |
| 8,196,515 B2 | | 6/2012 | Streibich et al. |
| 8,235,102 B1 | | 8/2012 | Robertson |
| 8,327,926 B2 | | 12/2012 | Robertson |
| 8,336,612 B2 | | 12/2012 | Robertson et al. |
| 8,474,381 B2 | | 7/2013 | Streibich et al. |
| 8,662,169 B2 | * | 3/2014 | Cortez .................... E21B 17/02 166/256 |
| 8,685,187 B2 | | 4/2014 | Han et al. |
| 2005/0072568 A1 | | 4/2005 | Robertson |
| 2006/0037750 A1 | | 2/2006 | Wardlaw |
| 2012/0006547 A1 | | 1/2012 | Robertson et al. |
| 2012/0055666 A1 | | 3/2012 | Swor et al. |
| 2012/0199340 A1 | | 8/2012 | Robertson |
| 2012/0199351 A1 | | 8/2012 | Robertson |
| 2012/0255742 A1 | | 10/2012 | Cortez |
| 2013/0112320 A1 | | 5/2013 | Wright |
| 2014/0034315 A1 | | 2/2014 | Tallini et al. |
| 2014/0137761 A1 | | 5/2014 | Robertson et al. |
| 2014/0251612 A1 | | 9/2014 | Powers |
| 2014/0262249 A1 | | 9/2014 | Willberg et al. |
| 2015/0034317 A1 | | 2/2015 | Skjold |
| 2016/0214176 A1 | * | 7/2016 | Bruck .................... C23C 24/103 |
| 2016/0369597 A1 | | 12/2016 | Robertson et al. |
| 2017/0241227 A1 | | 8/2017 | Tallini et al. |
| 2017/0335646 A1 | | 11/2017 | Huang et al. |

FOREIGN PATENT DOCUMENTS

| | | |
|---|---|---|
| WO | WO2014138444 A2 | 9/2014 |
| WO | WO2016069305 A1 | 5/2016 |
| WO | 2016161283 A1 | 10/2016 |

OTHER PUBLICATIONS

International Preliminary Report on Patentability issued in the related PCT application PCT/2015/056161, dated May 2, 2017 (12 pages).

Yehuda Meir and Eli Jerby, Underwater Microwave Ignition of Hydrophobic Thermite Powder Enabled by Magnetic Encapsulation, Conference: 14th International Conference on Microwave and High Frequency Heating, Nottingham, UK, Sep. 2013 (4 pages).

Extended Search Report issued in the related EP Application 17193207.2 dated May 18, 2018 (8 pages).

Extended Search Report issued in the related EP Application 15855623.3 dated Jun. 29, 2018 (7 pages).

Exam Report issue in the related EP Application No. 17193207.2 dated Apr. 9, 2019, 6 pages.

Search Report and Written Opinion of International Patent Application No. PCT/US2018/065590 dated Mar. 27, 2019, 13 pages.

Office Action issued in the related U.S. Appl. No. 15/520,853 dated Mar. 19, 2019, 32 pages.

Office Action issued in the related U.S. Appl. No. 15/988,098 dated Dec. 26, 2019, 40 pages.

Communication pursuant to Article 94(3) EPC issued in the related EP Application 15855623.3 dated Jan. 27, 2020, 6 pages.

\* cited by examiner

| METAL OXIDES | METAL FUELS | GAS GENERATING METAL NITRATES | ALLOY ELEMENTS FOR THERMITE WELDING |
|---|---|---|---|
| $Bi_2O_3$, CoO, $Co_3O_4$, $Cr_2O_3$, CuO, $Cu_2O$, $Fe_2O_3$, $Fe_3O_4$, FeO, $I_2O_5$, $MnO_2$, NiO, $Ni_2O_3$, $PbO_2$, PbO, $Pb_3O_4$, $SnO_2$, $WO_2$, $WO_3$ | Al, Be, Cu, Mg, Fe, Si, Ti, Zr, Zn | $LiNO_3$, $NaNO_3$, $KNO_3$, $Mg(NO_3)_2$, $Ca(NO_3)_2$, $Sr(NO_3)_2$, $Ba(NO_3)_2$ | Ti, Zr<br>V, Nb<br>Cr, Mo, W<br>Mn. Co, Rh<br>Cu, Ag, Au<br>Zn, Cd<br>B, Al, Ga, In<br>Si, Sn, Pb<br>Sb, Bi |

SYSTEM AND METHODOLOGY FOR WELDING

BACKGROUND

In a variety of well applications many types of components are joined in sealing engagement. For example, plugs may be deployed downhole and actuated to form a sealing engagement with a surrounding tubing, e.g. casing. The plugs often comprise an elastomeric element which may be expanded to form a seal with the interior surface of the surrounding tubing. Other types of components also may be joined with tubing or with other downhole devices to form a permanent connection and/or seal. However, the process for joining components in a downhole environment can be difficult, particularly if the region is flooded with well fluid. Additionally, elastomeric elements may be susceptible to the adverse conditions often found in downhole environments.

SUMMARY

In general, a system and methodology facilitate welding in a variety of difficult environments, including downhole environments, to enable formation a dependable connection between components. According to an embodiment, a material mixture is employed in a tool, and the tool is conveyed to a position adjacent a weld region of components to be welded together. The material mixture is of a type which may be ignited to initiate a reaction which causes formation of a molten metal from at least one constituent in the material mixture. The tool also may comprise a nozzle oriented to direct the molten metal to the weld region so as to form a secure, welded connection between the components.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology which facilitate welding in a variety of difficult environments to enable formation of a dependable connection between components. For example, the system and methodology facilitate welding in downhole environments and in submerged, e.g. underwater, environments. The technique may be used for welding components within well tubing to form strong, sealed connections between, for example, tubing plugs and surrounding casing or other tubing. The welding may be performed in subsea environments and in wellbore environments in which the wellbore is filled with mud, water, or other fluids. However, the technique also may be used for surface applications to join components within tubing or in other difficult to reach locations.

According to an embodiment, a material mixture is installed in a tool, and the tool is conveyed to a position adjacent a weld region of components to be welded together. The material mixture is of a type which may be ignited to initiate a reaction which forms a molten metal from at least one constituent in the material mixture. By way of example, the material mixture may be a mixture of a metal powder fuel and a metal oxide which undergo an exothermic reaction. Additionally, the tool may comprise a nozzle oriented to direct the molten metal to the weld region so as to form a secure, welded connection between the components. Various additives may be combined with the material mixture to control aspects of the exothermic reaction, e.g. to control the reaction rate, to generate gas for clearing liquid from the weld region, to generate heat for preheating of the weld components, and/or to control other aspects of the reaction.

In various embodiments, the material mixture is in the form of thermite which is a pyrotechnic composition of the metal powder fuel and the metal oxide. For example, thermite may comprise an iron oxide and an aluminum powder mixture which can be ignited to react and release a large amount of heat in a short time. The material mixture also results in a molten elemental metal produced by the thermite reaction. This molten metal may be used to weld components in many types of environments, e.g. to weld components in a downhole environment. In a specific example, a downhole tool, e.g. a plug, may be welded to surrounding well casing by directing the molten metal to the desired weld region between those components.

The thermite also may be formed from other material mixtures that are able to undergo the exothermic reduction-oxidation reaction which generates substantial heat and results in the molten metal. The material mixture of the thermite may be adjusted to achieve a desired heat output and temperature for producing the desired resultant components, such as a separated molten metal and slag. For example, the size of the particles forming the material mixture may be selected so as to achieve a desired burn rate or reaction rate.

Additionally, alloying elements such as carbon and silicon may be added to the material mixture to cause formation of molten metal in the form of grey cast iron which expands when solidifying. The expansion can be useful when, for example, welding parts along the interior of well casing so as to push the casing outwardly rather than pulling the casing inwardly. Additives also may be added to the material mixture to provide desired mechanical and corrosion properties with respect to the resultant weld.

The material mixture also may comprise additives to help provide an initial blow of high temperature flame which may be directed to preheat the components to be welded at a weld region. Additives also may be used to initially create gas during the thermite reaction so as to clear liquid from around the region to be welded, thus assisting in forming a dependable weld. Once the liquid is cleared the molten metal, e.g. molten iron, may be directed through a nozzle and driven to a gap between the components being welded, e.g. to the gap between a plug and a surrounding well casing. The generation of gas also may be used to help force the molten metal through the nozzle. The ability to form a weld between the plug and the well casing creates a much stronger connection than provided by the friction force associated with conventional mechanical plugs or elastomeric elements.

Figure 1:
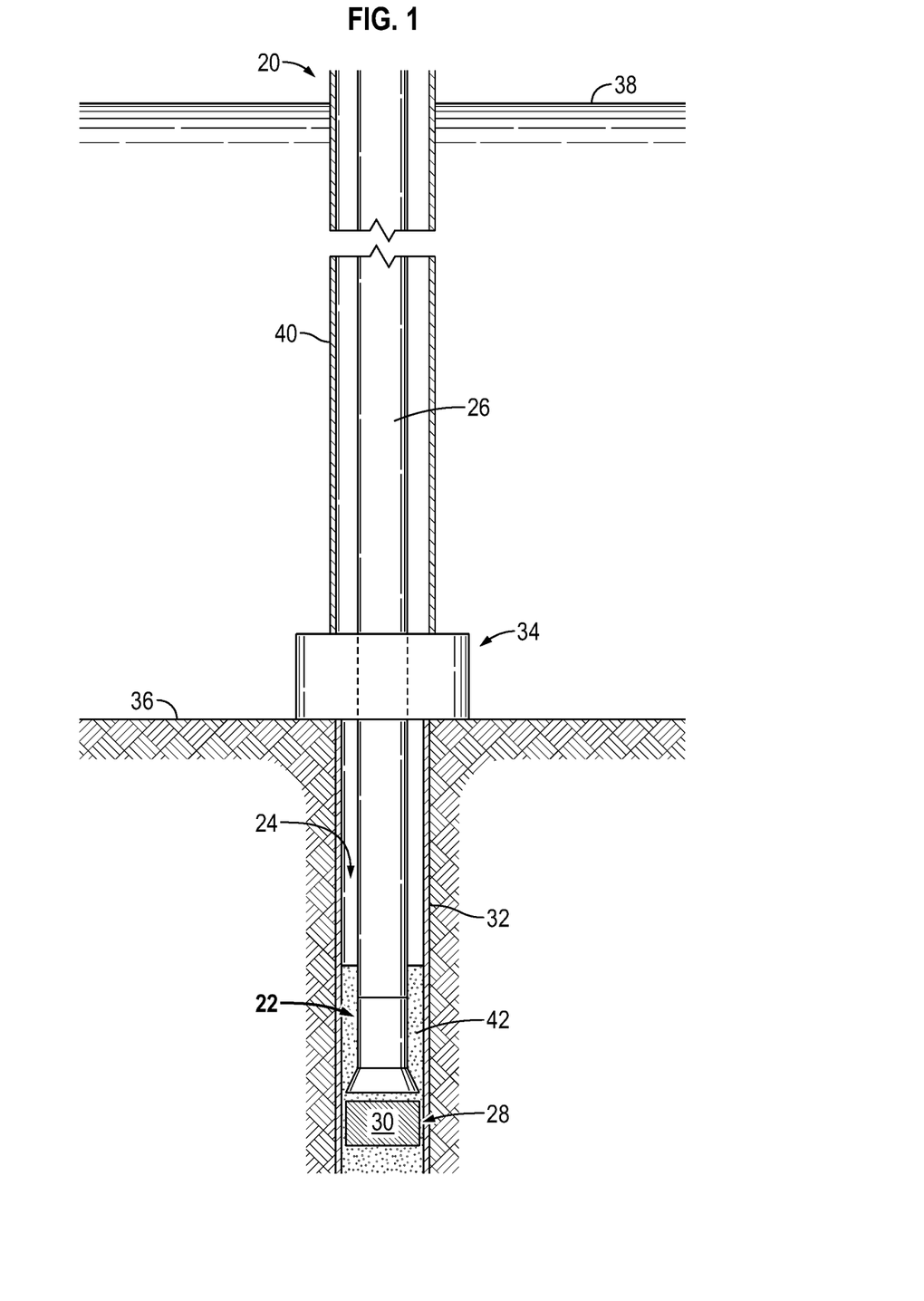
FIG. 1 is a schematic illustration of an example of a well string carrying a welding tool down into a subsurface borehole, according to an embodiment of the disclosure.

Referring generally to FIG. 1, an example of a system 20 for welding in a downhole subsurface environment, e.g. a subsea downhole environment, is illustrated. In this embodiment, the system 20 comprises a welding tool 22 which may be deployed downhole into a borehole 24, e.g. a wellbore. The welding tool 22 may be conveyed downhole via a conveyance 26 which may be in the form of a well string comprising coiled tubing, other tubing, wireline, or other suitable conveyance. The welding tool 22 is deployed into proximity with components 28 to be welded together. In a specific example, the components 28 to be welded may comprise a plug 30 and a surrounding casing 32. The welding tool 22 is utilized in forming a weld between the plug 30 and casing 32 so as to plug and seal the borehole 24. In some applications, at least one of the components 28, e.g. plug 30, may be attached to welding tool 22 and conveyed downhole to a desired welding location, thus effectively placing welding tool 22 proximate the components 28 to be welded. Additionally, the plug 30 may be constructed with particular structures selected according to parameters of specific applications.

The welding tool 22 may be operated in a variety of well related environments and other environments for joining many types of components 28. By way of example, the welding tool 22 may be deployed via conveyance 26 to a subsea well 34 at a seabed 36. The welding tool 22 may be deployed from a sea surface 38, down through a riser 40, and into wellbore 24 until positioned proximate the components 28 to be welded. In various subsea applications and other well related or non-well related applications, the welding tool 22 may be submerged into a liquid 42 and the welding operation may be performed at the submerged location. In well applications, the liquid 42 may comprise a variety of well fluids, e.g. water, mud, or hydrocarbon-based fluids. Welding tool 22 may be constructed to facilitate formation of dependable welds and component couplings even when the welding tool 22 is submerged in liquid 42.

Figure 2:
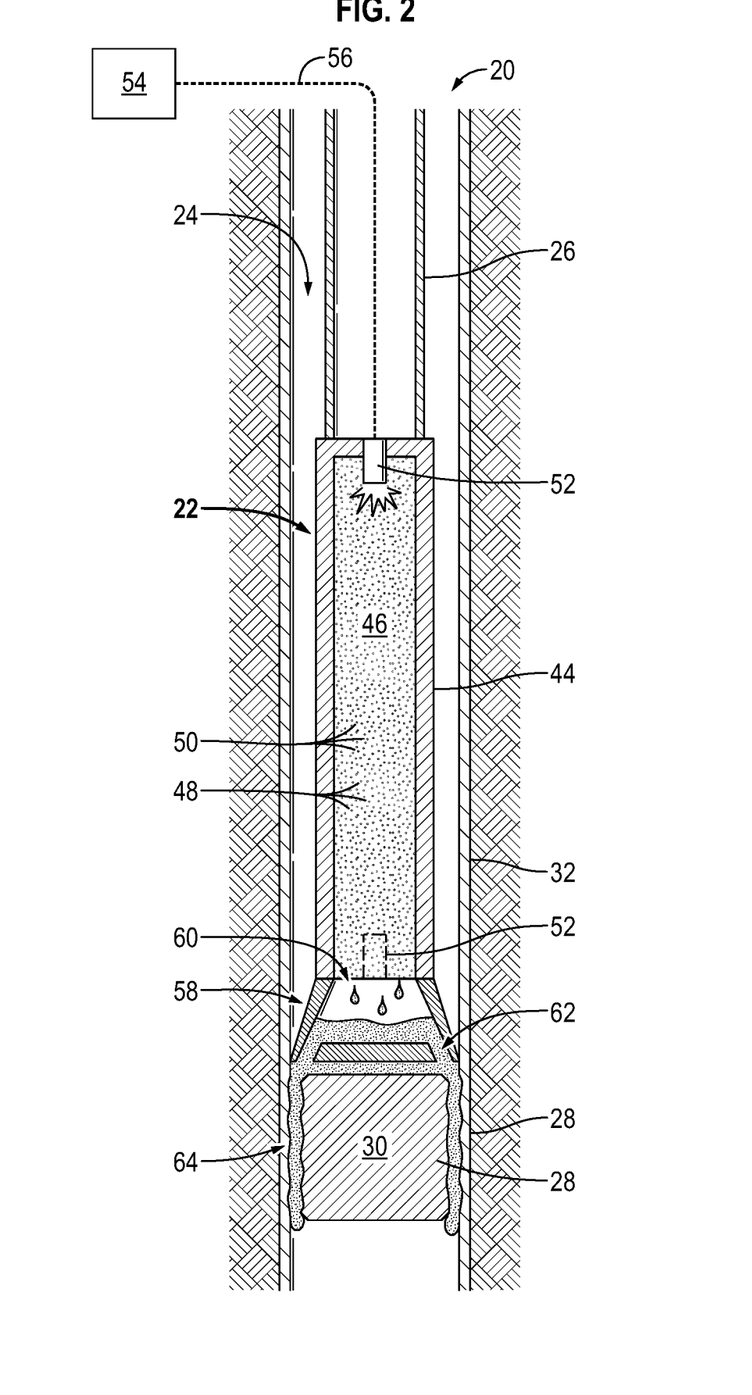
FIG. 2 is an illustration of an example of a welding tool deployed in a borehole and positioned for welding components together while downhole in the borehole, according to an embodiment of the disclosure.

Referring generally to FIG. 2, an example of welding tool 22 is illustrated as deployed in a borehole 24. In this embodiment, the tool 22 has been conveyed downhole into borehole 24 until at a desired location which is proximate the components 28, e.g. plug 30 and casing 32, to be welded. The welding tool 22 may comprise a housing 44 for containing a material mixture 46 of, for example, a metal powder fuel 48 and a metal oxide 50. By way of example, the material mixture 46 may comprise thermite and the metal powder fuel 48 and metal oxide 50 may comprise powder aluminum and iron oxide, respectively.

When the material mixture 46 is ignited an exothermic reaction is caused between the elemental aluminum 48 and iron oxide 50 and the resulting products are aluminum oxide, elemental iron, and a large amount of heat. The elemental iron may be produced as a molten metal for welding, as described in greater detail below. It should be noted that the reactants 48, 50 may comprise various other materials, e.g. elemental aluminum and copper oxide, which may be ignited to cause the desired exothermic reaction. Within housing 44, the reactants 48, 50 may be mixed in powdered form, combined with a binder which holds the material mixture 46 together, and compacted so as to avoid unwanted separation of constituents.

In the embodiment illustrated, the welding tool 22 further comprises at least one igniter 52 which may be selectively actuated to ignite the material mixture 46 and cause the exothermic reaction between the elemental metal fuel 48 and the metal oxide 50. By way of example, the igniter 52 may be positioned toward the top and/or bottom (see igniter in dashed lines) of the material mixture 46. The igniter 52 may be constructed in various forms able to ignite the material mixture 46, but one example is an electrically actuated igniter. In this latter example, the igniter 52 is coupled with an electrical power controller 54 by a suitable control line 56 which conveys electrical control signals from controller 54 to igniter 52 when ignition of material mixture 46 is desired. By way of example, the electrical power controller 54 or other control system may be located at the surface.

The welding tool 22 also may comprise a nozzle 58 positioned to direct the molten metal resulting from the exothermic reaction to a desired weld region along components 28. The nozzle 58 comprises an inlet region 60 for receiving products, e.g. molten metal, resulting from the exothermic reaction of material mixture 46. After ignition of material mixture 46, the resulting products are able to flow down through housing 44 and into nozzle 58 through inlet region 60. The nozzle 58 further comprises an outlet region 62, e.g. a jet, constructed and positioned to direct the products of the exothermic reaction to a desired weld region 64. If, for example, plug 30 is to be welded to surrounding casing 32, the outlet region/jet 62 may have an annular configuration to direct a reaction product, e.g. molten metal, to the annular space between plug 30 and casing 32. Because of the substantial heat of the products handled by nozzle 58, the nozzle 58 may be constructed from graphite or another suitable, heat resistant material.

Figure 3:
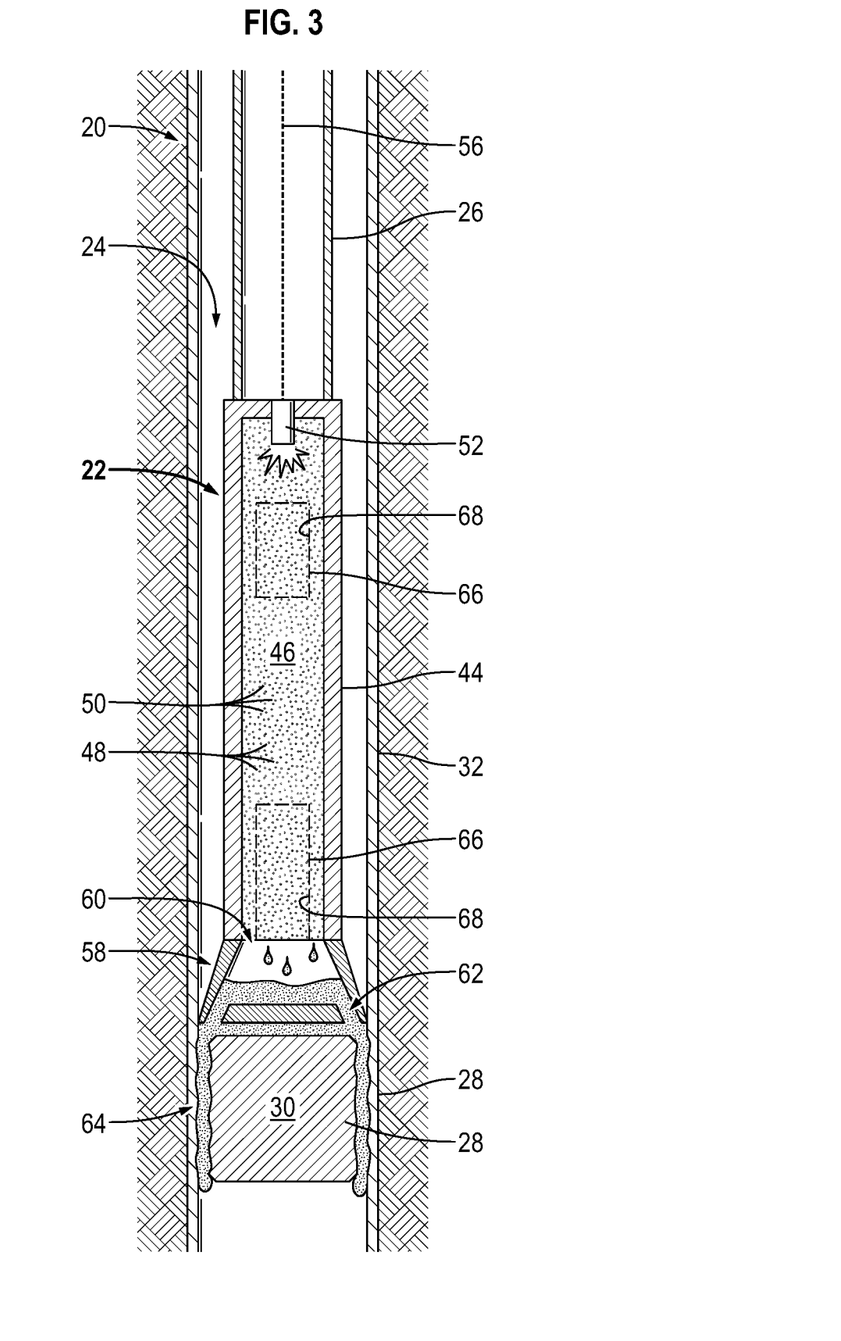
FIG. 3 is an illustration of another example of a welding tool deployed in a borehole and positioned for welding components together while downhole in the borehole, according to an embodiment of the disclosure.

Referring generally to FIG. 3, another embodiment of welding tool 22 is illustrated. In this example, an additive feature 66 may be added to the material mixture 46 to control an aspect of the exothermic reaction when the material mixture 46 is ignited. In some embodiments, as illustrated in FIG. 3, the additive feature 66 may be in the form of physical features 68 formed in the bound powder material of reactants 48, 50. The physical features 68 may comprise recesses, e.g. holes, passages, gaps, or other physical features 68, e.g. variations in density, within material mixture 46.

The physical features 68 may be arranged to control, for example, the burn rate or the amount of heat produced so as to achieve the desired application of molten metal during the welding process. In some applications, it is useful to preheat the components 28 at weld region 64 so as to ensure a better weld and better seal between the components 28. The additive feature 66, e.g. physical features 68, may be used to create a reaction rate able to promote initial preheating of the components 28 prior to receiving the molten metal used to form the weld.

Figure 4:
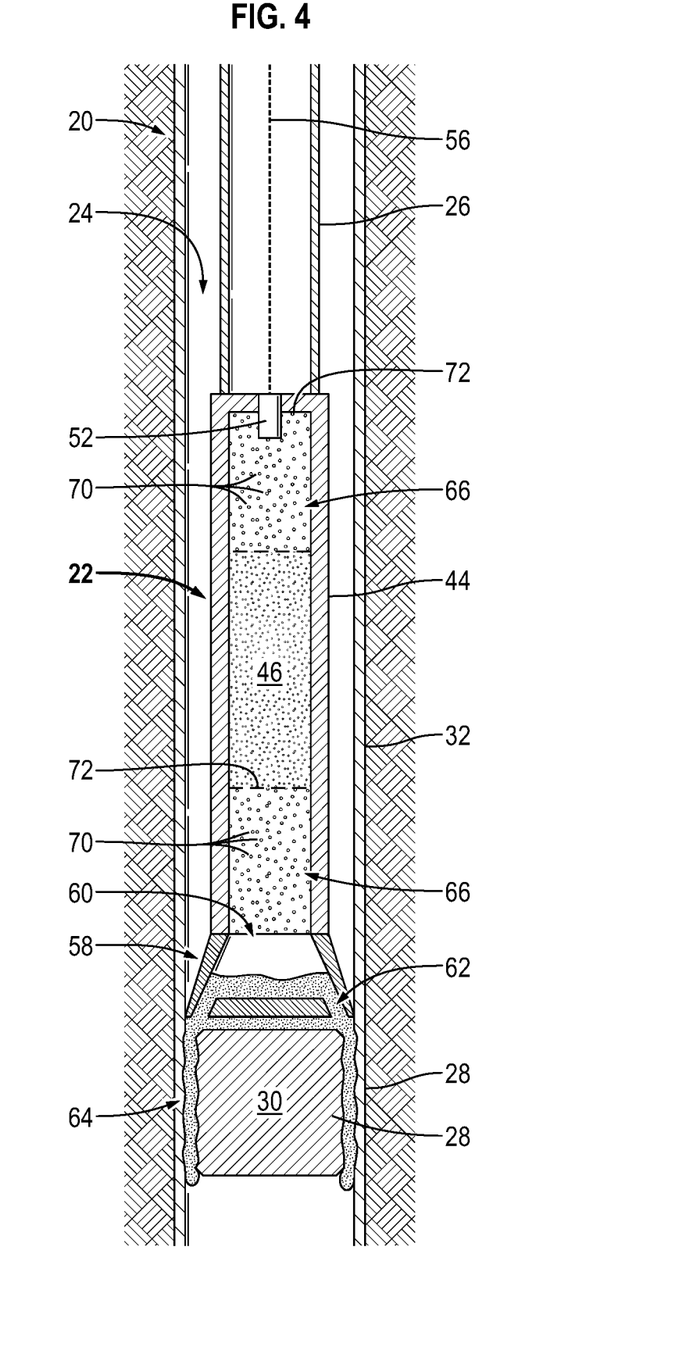
FIG. 4 is an illustration of another example of a welding tool deployed in a borehole and positioned for welding components together while downhole in the borehole, according to an embodiment of the disclosure.

As illustrated in the embodiment of FIG. 4, the additive feature 66 also may comprise material constituents 70 combined with material mixture 46 at specific regions 72 or throughout the material mixture 46. The constituent additive 70 may comprise materials used to produce a controlled initial flame for preliminary heating of components 28 at weld region 64.

However, the constituent additive 70 also may comprise materials which cause an initial production of gas which is directed through nozzle 58 to the weld region 64. The initial production of gas can be used to create gas pressure which drives out liquid from the weld region 64 to ensure an improved weld quality. Additionally, the additive 70 may be arranged so the generation of gas is created at an appropriate location within housing 44 to help drive out the molten metal into the weld region 64. It should be noted that a variety of other types of constituent additives 70, e.g. alloying elements, may be combined with material mixture 46 to enhance various aspects of the welding operation according to the parameters of a given application.

In some embodiments, additional molten metal may be initially driven to or through the weld region 64 to preheat components 28 at weld region 64. The delivery of molten metal to preheat the weld region 64 also can be used to gasify liquid 42 collected in the weld region 64, thus again driving the liquid 42 from weld region 64 to ensure a desired weld quality. By way of example, various metal nitrates, e.g. strontium nitrate, may be mixed into the thermite material mixture 46 to enhance the generation of gas during the exothermic reaction. This gas may then be directed through nozzle 58 to the weld region 64 or may be used to drive molten metal into or through weld region 64.

According to an embodiment of a welding operation, the welding tool 22 is deployed to a desired position, e.g. a position proximate components 28. Once in the desired position, a control signal is sent by controller 54 through control line 56 to igniter 52. The igniter 52 is thus actuated, e.g. sparked, electrically arced, or otherwise suitably actuated, to ignite the material mixture 46, e.g. thermite. Ignition of material mixture 46 causes the desired exothermic reaction between the elemental metal 48 and the metal oxide 50.

Figure 5:
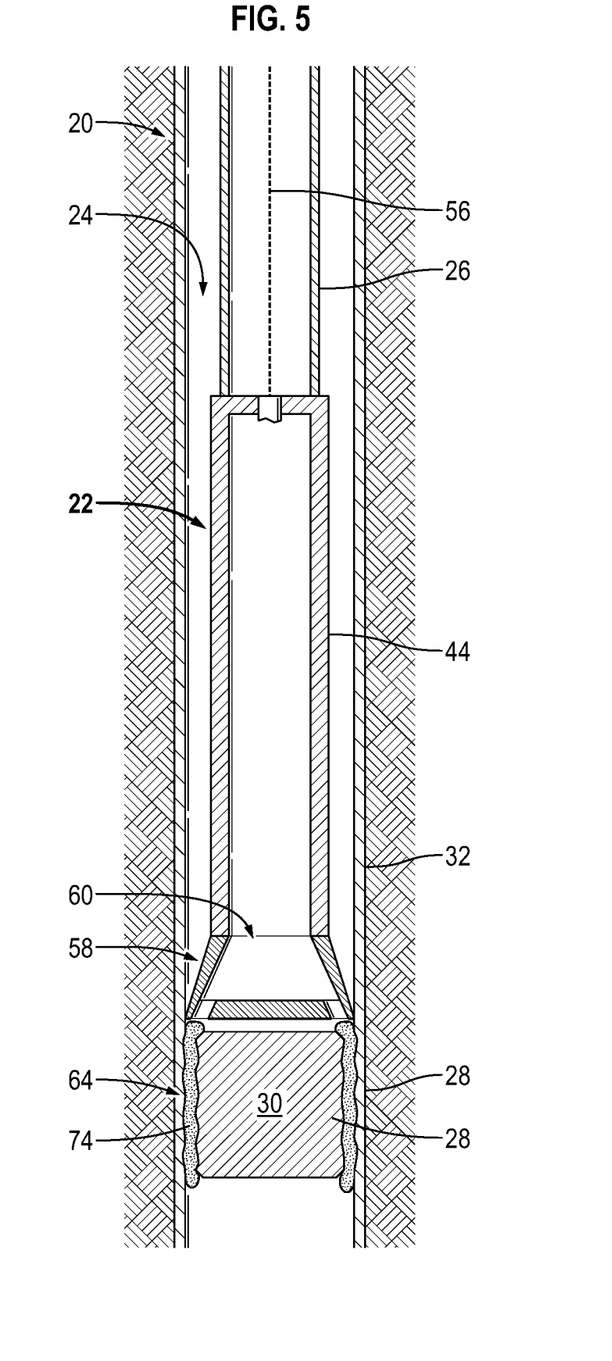
FIG. 5 is an illustration similar to that of FIG. 2 but during a different stage of the welding operation, according to an embodiment of the disclosure.

Depending on the additive or additives 66, the rate of the reaction, the gas production, and/or other aspects of the exothermic reaction may be controlled to, for example, provide the desired preheating of components and/or clearing of liquid from the weld area 64. Regardless, the exothermic reaction creates a molten metal 74 which flows from housing 44 of welding tool 22 and into the desired weld region 64, as illustrated in FIG. 5. In various applications, the molten metal 74 may comprise molten iron which forms a weld to create a strong, sealed connection between the components 28. In some applications, the liquid 42, e.g. water, brine, oil, may be used to quench the initial flow of molten metal 74 and to thus form a barrier which prevents escape of subsequently delivered molten metal 74.

Figure 6:
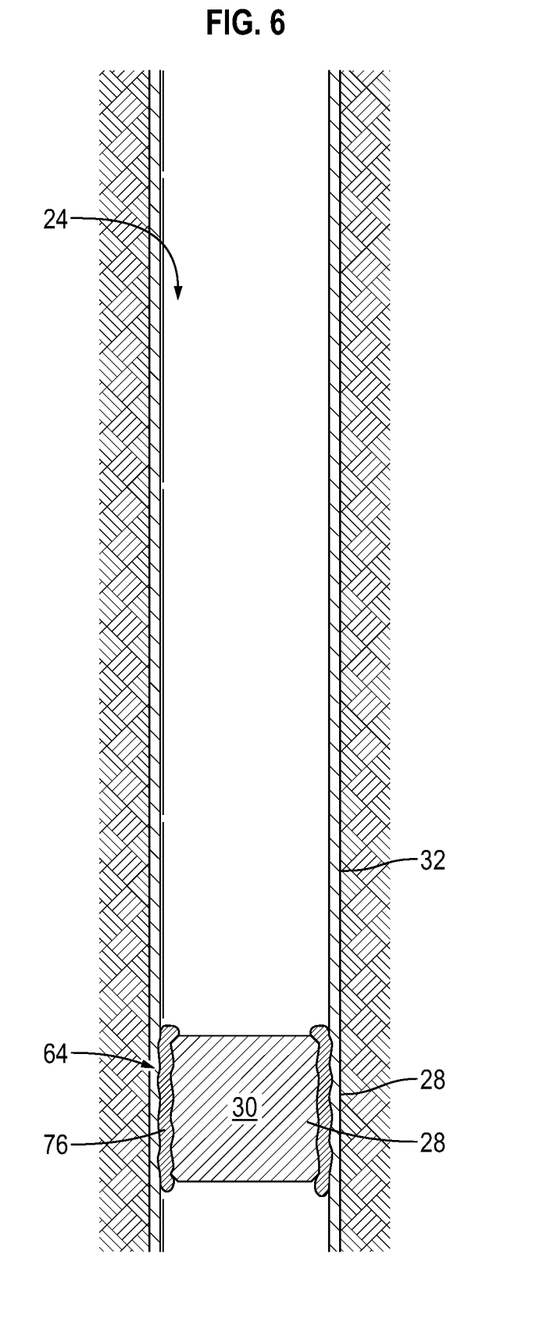
FIG. 6 is an illustration of an example of welded components after performance of the welding operation, according to an embodiment of the disclosure.

Once a sufficient amount of molten metal 74 is delivered from housing 44 into the desired region 64, the welding tool 22 (e.g. the remaining housing 44 and nozzle 58) may be removed, as illustrated in FIG. 6. The molten metal 74 solidifies at weld region 64 to form a solid weld 76. In the plug example, the solid weld 76 is formed around the circumference of plug 30 between the plug 30 and the surrounding casing 32. Consequently, the plug 30 is held securely in place along casing 32 and sealed with respect to casing 32 so that fluid is no longer able to flow past plug 30 along the interior of the casing.

The welding tool 22 may be used in a wide variety of applications and environments. For example, the welding tool 22 is amenable to use underwater or submerged in other liquids. In such embodiments, the material mixture 46 may be packed into a desired shape with the appropriate additive or additives 66 to create an initial high temperature flame and gas production. In this manner, the welding tool 22 may be used to create a transient gas environment at the weld region 64 to facilitate welding in the submerged environment. The flame and initial hot gas also may be used to preheat the components 28 at weld region 64 to further facilitate successful welding. In some applications, the gas atmosphere may be created by forcing out sufficient molten metal 74, e.g. molten iron, to preheat components 28 at weld region 64 and to boil off the water or other liquid at weld region 64. Quenching of the initial flow of molten metal 74 also can be used to effectively establish a restriction which prevents escape of the subsequent flow of molten metal 74. It should be noted that if the gap between components 28 is relatively large, a filler stick or filler ring may be added to prevent escape of the molten metal 74 from weld region 64.

Figure 7:
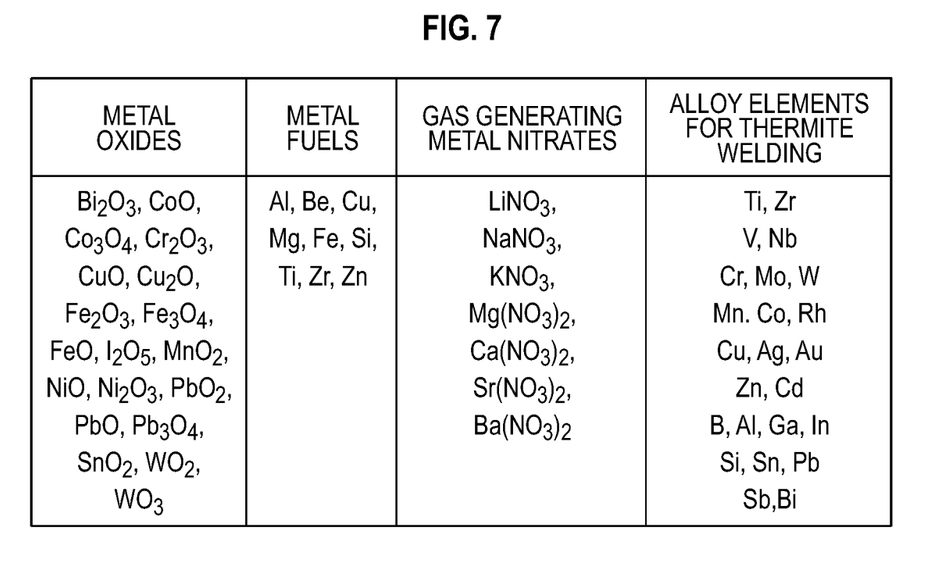
FIG. 7 illustrates a table listing examples of various constituents which may be mixed to form a reactive material mixture used in the welding tool, according to an embodiment of the disclosure.

By using thermite as the material mixture 46, a pure metal element, e.g. iron or copper, may be provided in molten metal form to the desired weld region 64. However, the material mixture 46 may be adjusted to accommodate different welding operations and welding environments. For example, many types of metal oxides 50 and metal fuels 48 may be used to obtain a desired molten metal 74. Additionally, various gas generating constituents, e.g. metal nitrates, may be added to material mixture 46 to provide a desired amount and rate of gas generation. Many types of physical features or alloying elements also may be added to material mixture 46 to adjust the reaction rate, the heat produced, or other characteristics of the exothermic reaction. As illustrated in the table of FIG. 7, several types of metal oxides 50 and metal fuels 48 may be combined to obtain the desired molten metal 74. Additionally, many types of constituents 70, e.g. gas generating constituents or alloying element constituents, may be combined into the material mixture 46, as further illustrated in FIG. 7.

The welding tool 22 may be used in many downhole operations for welding components within a wellbore. Examples include welding a metal ring to a surrounding tubing to provide stronger support with a smaller packer package, welding a metal plug or disk to the surrounding tubing, or welding to form a simple, strong, and sealed connection between components downhole. These are just a few examples of many well related and non-well related applications for welding tool 22.

Depending on the parameters of a given application, welding tool 22 may be constructed in a variety of sizes and configurations. For example, the size and shape of tool housing 44 may be adjusted according to the type of weld to be formed and to accommodate the desired amount of material mixture 46. In a variety of applications, the material mixture 46 may be formed from powdered constituents which are mixed and compacted into a disk or other desired form. The igniter or igniters 52 may have a variety of structures and may be placed at various locations in contact with material mixture 46. Similarly, the nozzle 58 may have a variety of configurations and be made from graphite or other materials suitable for a given application. In some applications the nozzle 58 may be constructed from or may comprise other materials, such as tungsten, tantalum, molybdenum, or other suitable heat resistant materials.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for welding in a downhole environment, comprising:

conveying a tool having a nozzle and a housing containing a mixture of a metal powder fuel and metal oxide downhole into a borehole until the tool is at a desired location proximate components to be welded, wherein said nozzle has an inlet region, an outlet region having an annular configuration and increasing width from the inlet region to the outlet region;

igniting the mixture to cause an exothermic reaction between the metal powder fuel and the metal oxide which releases metal from the metal oxide in the form of a molten metal; flowing said molten metal from said housing into said nozzle; and directing the molten metal using the nozzle to a desired annular-shaped region along the components to weld the components together along the desired annular-shaped region.

2. The method as recited in claim 1, wherein the mixture comprises a mixture of aluminum and iron oxide in the tool.

3. The method as recited in claim 1, wherein the mixture comprises a mixture of aluminum and copper oxide in the tool.

4. The method as recited in claim 1, wherein conveying comprises conveying the tool downhole into a subsurface wellbore with at least one of the components to be welded attached to the tool.

5. The method as recited in claim 1, wherein igniting comprises supplying an electric control signal to an igniter in contact with the mixture.

6. The method as recited in claim 1, further comprising generating a flame to preheat the desired region of the components to enhance the weld.

7. The method as recited in claim 6, wherein the flame is generated by exothermic reaction of additives in the mixture.

8. The method as recited in claim 1, further comprising using an additive in the mixture to control an aspect of the exothermic reaction.

9. The method as recited in claim 8, wherein said additive comprises a gas generating metal nitrate to enhance the generation of gas during said exothermic reaction, and said method further comprising the step of creating said gas and directing said gas, using the nozzle, over the desired region along the components to enhance the weld.

10. The method as recited in claim 1, wherein using the nozzle comprises directing the molten metal to form the weld between a plug and a surrounding wellbore casing.

11. A method, comprising:

containing a thermite mixture in a housing in a tool;

conveying the tool into a liquid when the tool is positioned adjacent to components to be welded together at a weld region;

igniting the thermite mixture to initiate a reaction which forms a molten metal;

providing a gas at the weld region to drive liquid away from the weld region;

flowing said molten metal from said housing into a nozzle on said tool, wherein said nozzle has an inlet region, an outlet region having an annular shape, and increasing width from the inlet region to the outlet region; and directing the molten metal using said nozzle of the tool to the weld region until the two components are welded together.

12. The method as recited in claim 11, wherein conveying comprises conveying the tool downhole into a wellbore containing the liquid.

13. The method as recited in claim 11, wherein igniting the thermite mixture causes the gas to be generated as a product of the reaction.

14. The method as recited in claim 11, further comprising using a flame from reaction of additives in the thermite mixture to preheat the weld region.

\* \* \* \* \*